United States Patent [19]
Shaw

[11] 3,770,989
[45] Nov. 6, 1973

[54] SOLID STATE THYRATRON
[76] Inventor: D. William Shaw, 1339 Midland Rd., Springfield, Ohio 45503
[22] Filed: July 20, 1972
[21] Appl. No.: 273,493

[52] U.S. Cl.......... 307/305, 307/252 A, 307/252 H, 307/252 J, 315/52
[51] Int. Cl. ........................................... H03k 17/72
[58] Field of Search.................. 307/252 A, 252 H, 307/252 J, 305; 315/52

[56] References Cited
UNITED STATES PATENTS

| | | | |
|---|---|---|---|
| 3,293,449 | 12/1966 | Gutzwiller...................... | 307/252 H |
| 3,371,227 | 2/1968 | Sylvan............................. | 307/252 J |
| 3,644,759 | 2/1972 | Hanby............................. | 307/252 J |

*Primary Examiner*—John Zazworsky
*Attorney*—Lawrence B. Biebel

[57] ABSTRACT

A solid state replacement device for a thyratron is mounted on a base having pins which correspond to the pins of the thyratron. The replacement device provides response characteristics on the base pins which are substantially the same as those provided by the corresponding thyratron, enabling the invention to be plugged into the thyratron socket as a replacement therefor.

14 Claims, 5 Drawing Figures

SOLID STATE THYRATRON

BACKGROUND OF THE INVENTION

This invention relates to solid state control circuits, and more particularly to a solid state replacement device for a vacuum tube thyratron, the replacement device being particularly well adapted for use in welding environments.

Thyratrons have proven extremely useful in the welding art, especially in spot welders, due to their combined qualities of high sensitivity and high current capacity. They have enabled highly sophisticated welding circuits to be developed in which extremely complex welding cycles are routinely employed. The large welding currents can be started and stopped at will, and at any point in the power supply cycle (commonly the 60 Hz. line supply).

Nevertheless, current thyratron tubes such as the 2050 have lifetimes which are considered quite short for industrial applications. Good quality 2050 tubes have become difficult to obtain, resulting in excessive tube useage and excessive production downtime, with quite large dollar losses. Annual comsumption of these tubes even by comparatively small users often exceeds several thousand.

In the long run this problem may be obviated by the trend which is now apparent toward solid state control systems. However, a very large number of tube controlled welders is still in use, and a fair number are still being produced.

One solution to this problem, of course, is to redesign and modify each individual tube type control circuit already in existence. In some situations little more would be required than to solder an appropriate silicon controlled rectifier (SCR) into the circuit. However, this would not be satisfactory in the majority of cases.

Thus in most cases, replacement of the thyratron with an SCR or other solid state device would require disassembly of the welding control unit, analysis of the circuit, custom design of an appropriate replacement, and custom modification thereof.

SUMMARY OF THE INVENTION

Briefly, this invention includes a solid state circuit having electrical characteristics which are substantially the same as those provided by a corresponding vacuum tube thyratron. The circuit is thus universally substitutable into virtually all circuits employing such a thyratron, regardless of individual circuit characteristics. Furthermore, the solid state circuits of this invention are mounted upon bases which correspond to those of the equivalent thyratrons, enabling direct physical substitution into corresponding thyratron sockets. Conversion of any appropriate circuit may therefore be made with little more inconvenience than that incurred in replacing a thyratron tube itself.

In the present invention a gate controlled thyristor, such as a silicon controlled rectifier (SCR), performs the principal current control function formerly provided by the thyratron itself. The anode and cathode of the gate controlled thyristor are connected to the pins on the base normally used for connection with the anode and cathode of the thyratron.

In order to provide sensitivity characteristics corresponding to those of the corresponding thyratron, a voltage sensitive device, in this case a field effect transistor (FET), is connected to control the gate electrode of the gate controlled thyristor circuit. The gate of the FET is connected to the pin on the mounting base normally used by the grid of the thyratron, enabling voltages applied to the "grid" pin to control the FET to operate the thyristor to provide response characteristics on the pins of the base substantially the same as those provided by a corresponding thyratron.

Since the thyratron circuits are generally supplied with and operated by an AC power supply, the solid state replacement device of this invention includes a DC power supply for the FET to enable the FET to drive the thyristor even at low sine angles in the power supply cycle. Without the DC power supply, which is connected to the pins normally used by the thyristor filament, the FET would not be able to fire the thyristor until later in the cycle when the voltage became great enough. In one embodiment the DC power supply is a full wave voltage doubler to develop sufficient voltage for the FET.

Further, to approximate the characteristics of a corresponding thyratron, the circuits of this invention may include a diode and a zener diode connected between the pins corresponding to the grid (control grid or screen grid) and cathode elements of the thyratron to provide a low impedance path for positive signals applied to the "grid" pin, similar to thyratron grid conduction. The circuit may also include a diode connected between the "screen grid" pin and the FET gate to enable the replacement device of this invention to provide the equivalent of screen grid control, in response to corresponding voltages applied thereto. Also, a resistor may be connected between the "grid" and "cathode" pins of the base to provide the equivalent of thyratron grid input impedance.

It is therefore an object of this invention to provide a solid state replacement device for a thyratron; a device having a base with a plurality of pins corresponding to the pins of a thyratron, to enable the replacement device to be plugged into a corresponding thyratron socket; a device using a gate controlled thyristor circuit connected to the pins normally used by the anode and cathode of the thyratron; a replacement having a voltage sensitive device connected to and controlled by the pin on the base normally used by the grid of the thyratron and controlling the thyristor circuit; a replacement device thus providing response characteristics on the pins on the base thereof substantially the same as those provided by a corresponding thyratron; a device which can also duplicate thyratron screen grid control, thyratron grid conduction, and thyratron grid input impedance; and to accomplish all the above objects and purposes in an inexpensive, compact, and highly useful configuration readily substitutable into virtually every environment presently employing a corresponding vacuum tube thyratron, to eliminate substantially all expenses and downtime resulting from thyratron failure in these circuits.

Other objects and advantages of the invention will be apparent from the following description, the accompanying drawings and the appended claims.

DESCRIPTION OF THE PREFERRED EMBODIMENTS

Figure 1:
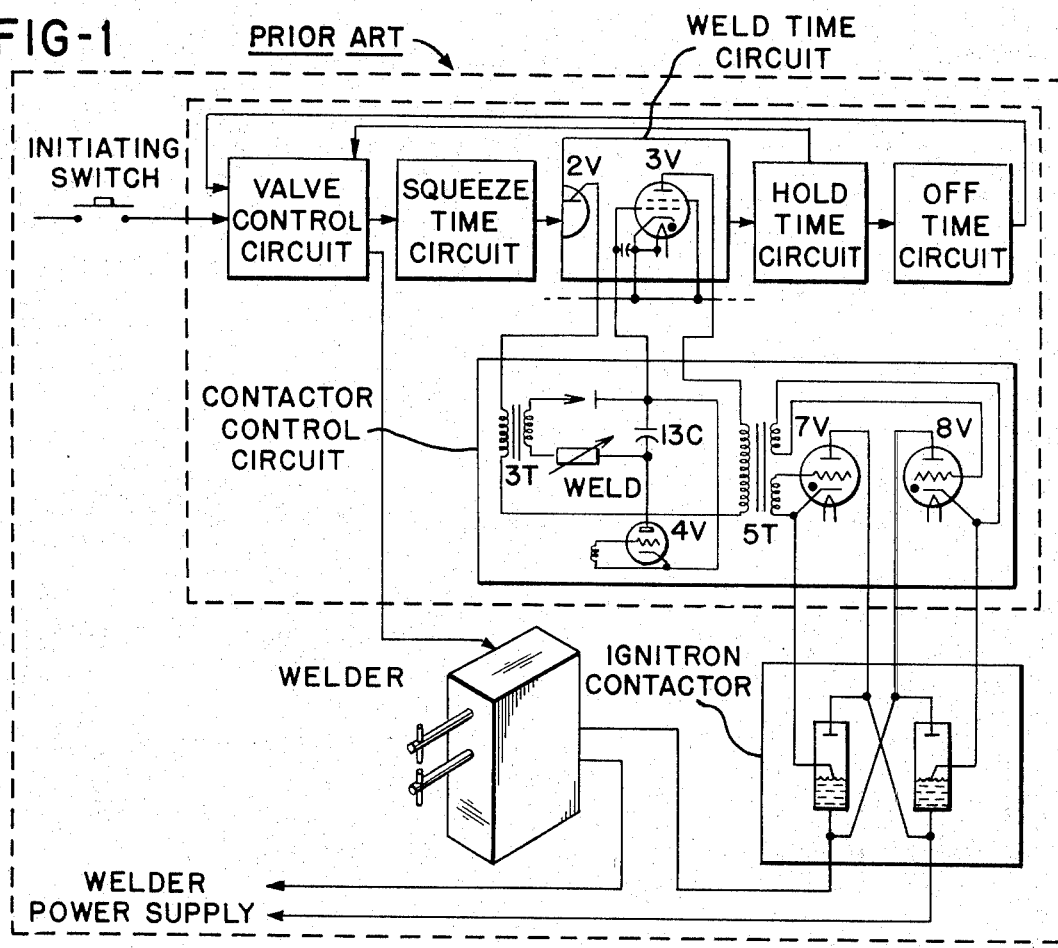
FIG. 1 is a block diagram of a typical spot welder control circuit, showing two types of prior art thyratrons incorporated therein.

With reference to the drawings, and more particularly to FIG. 1, there is illustrated a block diagram from a typical resistance welding control circuit employing prior art thyratrons, such as the C3JL denoted by reference numerals 7V and 8V, and the 2050 denoted by reference numeral 3V.

Figure 2:
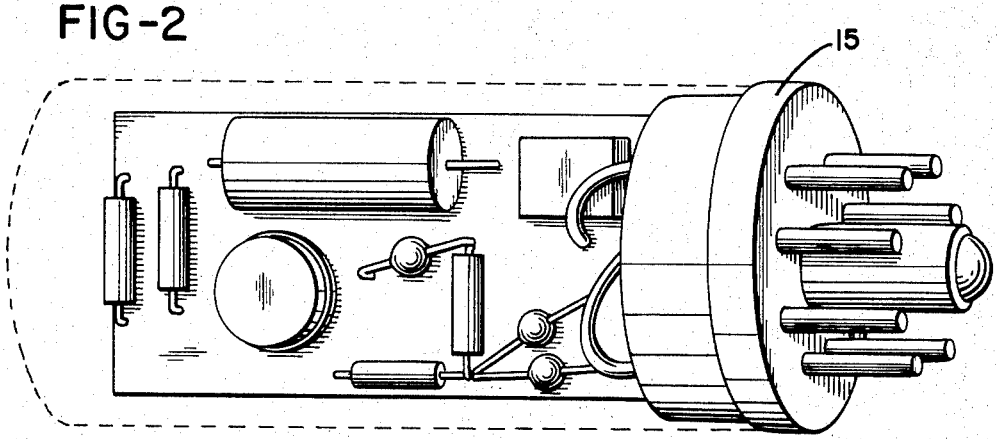
FIG. 2 is a broken away side view of the solid state replacement device of this invention, showing several of the components thereof mounted on a circuit board, and showing these in turn mounted on an octal socket.
Figure 3:
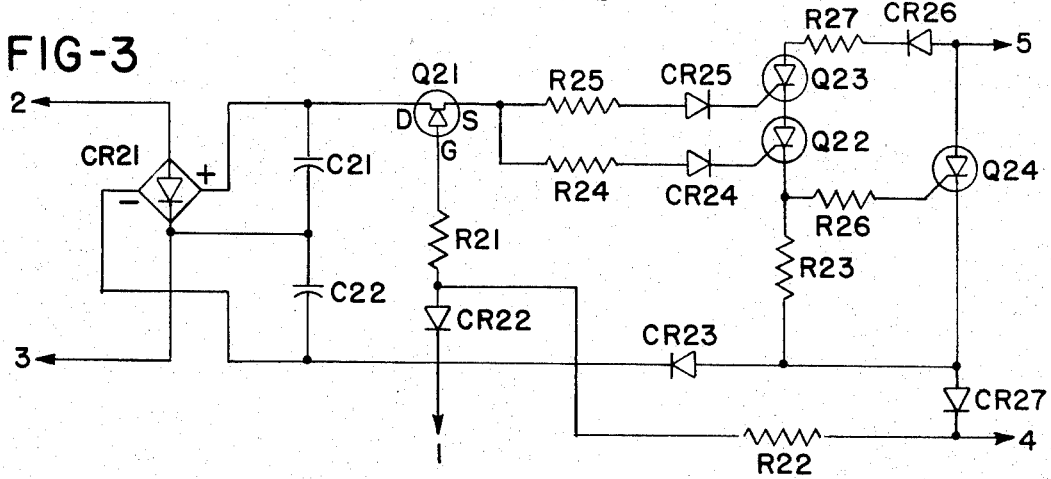
FIG. 3 is a schematic diagram for a solid state replacement for a type C3JL thyratron.
Figure 4:
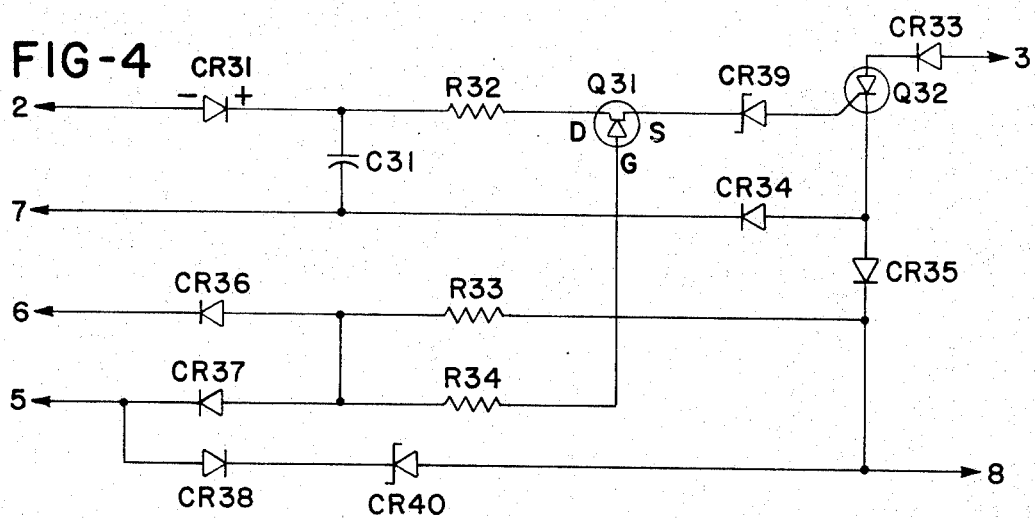
FIG. 4 is a schematic diagram for a solid state replacement for a type 2050 thyratron.

FIGS. 3 and 4 illustrate circuits of this invention for solid state replacement devices for the C3JL and 2050 thyratrons above. These circuits are mounted upon multi-pin bases, such as base 15 (FIG. 2). Base 15 is illustrated as an octal socket corresponding to the socket for a 2050 thyratron.

With particular reference to FIG. 3, there is illustrated therein the circuit for a solid state replacement for a C3JL thyratron. This circuit may be mounted on a base similar to base 15, but corresponding in this case to the C3JL base itself. Terminals 2 and 3 in FIG. 3 are the equivalent of the filament terminals of the C3JL, and are therefore connected to respective pins 2 and 3 on the replacement device base. Terminal 5 is the plate terminal, terminal 4 is the cathode connection, and terminal 1 is the control grid connection. The full wave bridge CR21 and the capacitors C21 and C22 form a voltage doubler to increase the 2.5 VAC filament voltage to 5VDC. The output of this DC power supply is connected to the drain of a field effect transistor (FET) Q21. The DC power supply provides operating power for the FET which in turn controls a thyristor circuit composed of silicon controlled rectifiers (SCR's) Q22, Q23, and Q24. The FET Q21 controls the firing of the SCR's Q22 and Q23, which in turn trigger Q24 into conduction. By this means, control signals applied to the "control grid" pin are able to control the main SCR Q24 to provide response characteristics on the pins of the mounting base substantially the same as those provided by the corresponding C3JL.

R21 limits the gate current in the FET Q21. CR22 prevents positive voltage for being applied to the FET gate. R22 is connected essentially between the "grid" pin and the "cathode" pin of the base to provide essentially an equivalent of the thyratron grid input impedance of 10 meg ohms. R24 and R25 cooperate with CR24 and CR25 between the gate electrodes of Q22 and Q23 and the source of FET Q21 to balance the impedance between the gates of Q22 and Q23, to limit the current flow through the FET, and to provide isolation between the gates of Q22 and Q23.

CR26 is connected between the "anode" or "plate" pin 5 and the anode of SCR Q23 to prevent transistor action in Q22 and Q23 when the anode voltage is negative.

As may be seen, Q22 and Q23 serve as control thyristors to control the main SCR Q24. R23 and R27 limit the current flow through Q22 and Q23 and serve as a voltage divider to supply the required voltage to trigger Q24. R26 serves to limit Q24 gate current; CR23 and CR27 provide isolation between the trigger circuit and the cathode to anode supply.

The C3JL circuit of FIG. 3 has proven successful when the following components and values were employed:

C3JL TABLE

| | |
|---|---|
| C21 and C22 | Sprague TE 1210, 75μf, 25V |
| CR21 | Motorola 25V, 1Amp, Full Wave Bridge MDA920A-1 |
| CR22 thur 26 | IN5062 Diode |
| CR27 | IN3495 Diode |
| Q21 | Siliconix U266, FET, BVGD = 170 V Min., VP = 5 to 10 V Max., Part FN2651 |
| Q22 & 23 | SCR 1R106D4 (400V, 4-Amp.) |
| Q24 | SCR NL-511-3 (800V, 16 Amp.) |
| R21 | 500K, ½ Watt ± 10% |
| R22 | 10Meg, ½ Watt ± 10% |
| R23 & 27 | 100Ω, ½ Watt ± 10% |
| R24 & 25 | 560Ω, ½ Watt ± 10% |
| R26 | 33Ω, ½ Watt ± 10% |

The circuit will turn on when the voltage at terminal 1 rises above the firing point (EG critical). EG ranges from $-6V$ to $-12V$. The exact value depends upon the pinch off voltage (VP) of the FET, and the value of R21, the voltage output of the DC power supply, and the amount of external grid resistance, which should not exceed 2 meg for satisfactory operation. EG is extremely stable and repetitive over wide variations in temperature and supply voltages. When EG is reached, the drain to source resistance of the FET changes from a high value to a low value, allowing sufficient current flow to trigger Q22 and Q23. When the voltage at terminal 1 is more negative than EG, the FET has a high drain to source resistance. This high resistance lowers the gate current flow in Q22 and Q23 below that required for triggering.

The general electrical characteristics of this circuit are as follows:

| | |
|---|---|
| Maximum RMS Cathode to Anode Voltage | 520 VAC |
| Maximum Control Grid Voltage | 170 V |
| Maximum RMS Current | 16 AMPS |
| Firing Point (EG Critical) depends upon external grid resistance | $-6V$ to $-12V$ |
| Range of Grid Resistance | 10K to 2 MEG |
| Input Impedance | 10 MEG |

With reference to FIG. 4, there is illustrated a circuit similar to that of FIG. 3. The circuit of FIG. 4 is a solid state replacement for a 2050 thyratron, and is mounted upon the base 15 illustrated in FIG. 2.

Similarly as in the C3JL replacement, terminals 2 and 7 of the 2050 replacement are the equivalent of the filament input terminals. Terminal 3 is the plate or anode, terminal 8 the cathode, terminal 5 the control grid, and terminal 6 the screen grid.

Figure 4A:
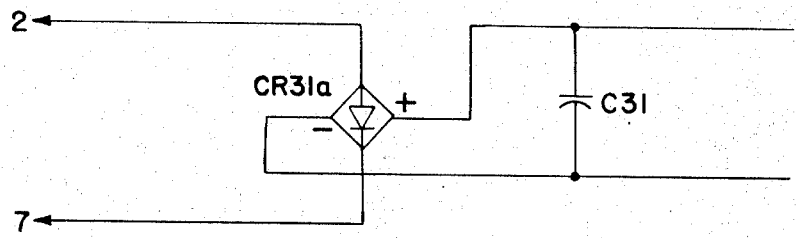
FIG. 4a is a schematic diagram of an alternate DC power supply for the circuit of FIG. 4.

Diode CR31 rectifies the 6.3 VAC filament supply, and capacitor C31 filters the DC output. An optional full wave bridge CR31a, illustrated in FIG. 4a, may be substituted for the DC supply circuit of CR31 in FIG. 4, where desired. Ordinarily, the half wave supply of CR31 is sufficient.

The field effect transistor (FET) Q31 controls the firing of the gate controlled thyristor circuit connected between the anode and cathode pins 3 and 8. The thyristor circuit in this case is a silicon controlled rectifier (SCR) Q32. The power supply provides operating potential for FET Q31, while resistor R32 limits the current through Q31 and the SCR Q32 gate, and diodes CR34 and CR35 provide isolation between the FET trigger circuit and the cathode to anode supply. CR33 is connected between the anode pin 3 and the anode of Q32 to prevent transistor action therein when the anode is negative.

The gate electrode of the FET Q31 is connected to the pin 5 corresponding to the control grid of the corresponding thyratron. A diode CR37 and a resistor R34 are connected in series between the gate electrode of FET Q31 and its corresponding pin.

A diode CR36 is connected between the gate of FET Q31 and the pin 6 normally used by the screen grid of the thyratron to enable the solid state replacement device to provide the equivalent of screen grid control in response to corresponding voltages applied to the screen grid pin. CR36 and CR37 also provide isolation between the control grid and screen grid supplies.

R33 is connected between the "grid" pin and "cathode" pin of the base to provide 10 meg ohm input impedance to negative control signals. R34 limits the gate current in FET Q31.

A diode CR38 and a zener diode CR40 are connected between the pins corresponding to the grid and cathode elements of the vacuum tube thyratron to provide a low impedance path for positive signals applied to the "grid" pin, similar to thyratron grid conduction or grid rectification in the 2050 thyratron. CR38 and cR40 can be eliminated if this feature is not needed, giving an almost infinite impedance to positive control signals. This same feature can be added to the screen grid.

Resistor R32 and a zener diode CR39 are connected in series with the FET Q31 between the voltage output of the power supply and the thyristor circuit to limit the current through the FET Q31. The zener diode CR39 also provides bias for Q31.

The circuit will turn on when the voltage at both terminals 5 and 6 rises above the firing point (EG critical). EG ranges between −2V and −6V. The exact value depends upon the pinch off voltage (VP) of the FET, the value of R34, the voltage output of the DC power supply, the value of CR39, and the amount of external grid resistance. The external grid resistor should not exceed 3.3 meg ohms for satisfactory operation. EG is extremely stable and repetitive over wide variations in temperature and supply voltages. When EG is reached, the drain to source resistance of the FET changes from a high value to a low value, allowing sufficient current to flow to trigger the SCR. When the voltage at either terminal 5 or 6 is more negative than EG, the FET has a high drain to source resistance. This high resistance lowers the gate current flow in the SCR below that required for triggering. The pinch off voltage (VP) of the FET is well defined giving the device a switching transfer characteristic that exceeds that of a 2050 thyratron. The EG of a 2050 is usually around −2V in welding control circuits.

By selecting the proper value for CR39, the solid state device will have an EG of −2V to −6V for an external grid resistor of less than 1 meg ohm. If the external grid resistor is greater than 1 meg ohm EG will increase. This effect can be eliminated in some circuits by connecting a 0.02 MFD capacitor between terminals 5 and 8. In most welding circuits the proper selection of CR39 will eliminate the need for recalibration.

The screen grid control feature allows the device to provide delayed firing for the first half cycle when used in existing welding controls having "peaker circuits" for this purpose.

The general characteristics of the device are as follows:

Maximum RMS cathode to anode voltage = 200V
Maximum screen grid or control grid voltage = 170V
Maximum RMS current = 1 amp
Firing point (EG critical) depends upon external grid resistance = −2V to −6V
Negative input impedance = 10 meg
Range of external grid resistance = 10K to 3.3 meg The 2050 circuit of FIG. 4 has proven successful when the following values and components were employed:

2050 TABLE

| | |
|---|---|
| C31 | Sprague TE 1210, 75µf, 25V |
| CR31 | IN5060 Diode |
| CR31a | Motorola 25V, 1 Amp, Full Wave Bridge MDA920A-1 |
| CR33 thru 38 | Diode IN5060 |
| Q31 | Silconix U266, FET, BVGD = 170V MIN., Vp = 5 to 10V Max., Part FN 2651 |
| Q32 | SCR IR106C-2 |
| R32 | IK, ½ Watt ± 10% |
| R33 | 10 Meg., ½ Watt ± 10% |
| R34 | 510K, ½ Watt ± 10% |
| CR39 | ½ Watt, Zener Diode (2.5V to 6.2V) |
| CR40 | IN5245, Zener Diode |

As may be seen, therefore, the present invention provides a direct solid state replacement for existing vacuum tube thyratrons. The invention may be plugged directly into the corresponding thyratron sockets, with no circuit modifications normally being required. The invention provides response characteristics on the pins of the base thereof which correspond to those of the thyratron it replaces, and at the same time provides much longer life and much greater reliability than can presently be obtained with vacuum tubes.

While the forms of apparatus herein described constitute preferred embodiments of this invention, it is to be understood that the invention is not limited to these precise forms of apparatus, and that changes may be made therein without departing from the scope of the invention.

What is claimed is:

1. A solid state replacement device for a thyratron, comprising:
   a. a base having a plurality of pins corresponding to the pins of the thyratron, to enable said replacement to be plugged into a corresponding thyratron socket,
   b. a gate controlled thyristor circuit having an anode and a cathode connected to the pins normally used for connection with the anode and cathode of the thyratron,
   c. a DC power supply with input connected to the pins normally used by the filament of the thyratron, and
   d. a voltage sensitive device connected between said power supply and at least one gate electrode of said gate controlled thyristor circuit, said voltage sensitive device having a gate electrode connected to the pin normally used by the grid of the thyratron to enable control voltages applied to the grid pin to control said voltage sensitive device to operate said thyristor circuit to provide response characteristics on the pins of said base substantially the same as those provided by a corresponding thyratron.

2. The device of claim 1 wherein said voltage sensitive device is a field effect transistor (FET) having:
   a. a source electrode connected to at least one gate electrode of said thyristor circuit,
   b. a drain electrode connected to the positive voltage output of said power supply, and
   c. a gate electrode connected to the pin normally used by the grid of the thyratron.

3. The device of claim 2 further comprising a diode and a current limiting resistor connected in series between said gate electrode of said FET and its corresponding pin.

4. The device of claim 3 further including a diode connected between the pin normally used by the screen grid of the thyratron and the gate of said FET to enable said replacement device to provide the equivalent of screen grid control in response to corresponding voltages applied thereto, and to cooperate with said FET gate diode to provide isolation between the grid and screen grid pins.

5. The device of claim 3 wherein the firing voltage of said FET is determined by the value of said resistor in series with the gate electrode of said FET and by the voltage output of said power supply.

6. The device of claim 2 further comprising a resistance circuit in series with said FET between said voltage output of said power supply and said thyristor circuit to limit the FET current.

7. The device of claim 6 wherein said resistance network further includes a zener diode connected between said FET and said thyristor circuit to provide bias for said FET.

8. The device of claim 1 further comprising a diode and a zener diode connected between the pins corresponding to the grid and cathode elements of the thyratron to provide a low impedance path for positive signals applied to the "grid" pin, similar to thyratron grid conduction.

9. The device of claim 1 wherein said power supply is a full wave bridge rectifier.

10. The device of claim 1 wherein said power supply is a full wave voltage doubler.

11. The device of claim 1 further comprising a resistor connected between the "grid" pin and the "cathode" pin of said base to provide the equivalent of thyratron grid input impedance.

12. The device of claim 1 further comprising a diode connected between the "anode" pin and the anode of a thyristor in said thyristor circuit to prevent transistor action in said thyristor.

13. The device of claim 1 wherein said thyristor circuit further comprises:
   a. two control thyristors connected in series,
   b. voltage divider resistors connected in series with said control thyristors between said control thyristors and the "anode" pin and between said control thyristors and the "cathode" pin to limit the control thyristor current and to cooperate with said control thyristors to form a voltage divider network,
   c. separate series diode and resistor networks each connected in series between the gate electrode of a corresponding said control thyristor and said voltage sensitive device, to limit the current through said voltage sensitive device and to balance the control thyristor gate impedances, and
   d. a main SCR having the anode and cathode thereof connected to the pins normally used for connection with the anode and cathode of the thyratron, and having the gate thereof connected to said control thyristor voltage divider network.

14. A solid state replacement device for a thyratron, comprising:
   a. a base having a plurality of pins corresponding to the pins of the thyratron, to enable said replacement to be plugged into a corresponding thyratron socket,
   b. a gate controlled thyristor circuit having an anode and a cathode connected to the pins normally used for connection with the anode and cathode of the thyratron,
   c. a diode connected between the "anode" pin and the anode of a thyristor in said thyristor circuit to prevent transistor action in said thyristor,
   d. a DC power supply with input connected to the pins normally used by the filament of the thyratron,
   e. a field effect transistor (FET) connected between said power supply and at least one gate electrode of said gate controlled thyristor circuit, said FET having a gate electrode connected to the pin normally used by the grid of the thyratron, a source electrode connected to at least one gate electrode of said thyristor circuit, and a drain electrode connected to the positive voltage output of said power supply,
   f. a diode and a current limiting resistor connected in series between said gate electrode of said FET and its corresponding pin,
   g. a resistance circuit in series with said FET between said voltage output of said power supply and said thyristor circuit to limit the FET current, and
   h. a resistor connected between the "grid" pin and the "cathode" pin of said base to provide the equivalent of thyratron grid input impedance, said solid state replacement device enabling control voltages applied to the "grid" pin to control said FET to operate said thyristor circuit to provide response characteristics on the pins of said base substantially the same as those provided by a corresponding thyratron.

* * * * *